Figure 1:
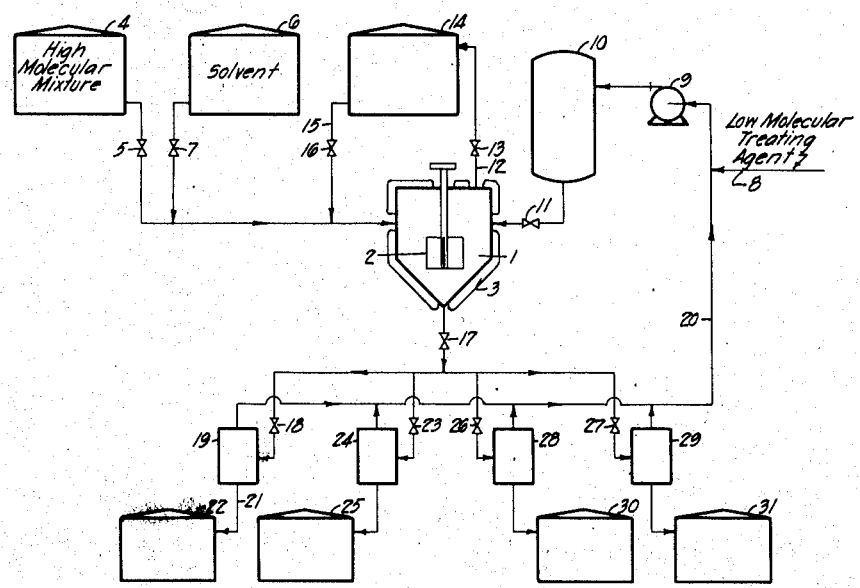

May 5, 1942.　　W. J. D. VAN DIJCK　　2,281,865

PROCESS FOR SEPARATING HIGH MOLECULAR MIXTURES

Filed March 20, 1936　　2 Sheets-Sheet 1

Inventor: Willem J. D. Van Dijck
By his Attorney:

Patented May 5, 1942

2,281,865

UNITED STATES PATENT OFFICE 2,281,865

PROCESS FOR SEPARATING HIGH MOLECULAR MIXTURES

Willem J. D. van Dijck, The Hague, Netherlands, assignor to Shell Development Company, San Francisco, Calif., a corporation of Delaware Application March 20, 1936, Serial No. 69,823
In the Netherlands March 22, 1935

21 Claims. (Cl. 196—13)

This invention relates to improvements in the method of separating mixtures of high-molecular substances, such as petroleum oils, shale oils, oil fractions obtained by distillation of crude oils, shale oils, coal tar oils, animal oils, and vegetable oils, natural and synthetic resins, natural and synthetic waxes and other high polymers such as rubber and the like or voltolized waxes, oils or gases into fractions having different chemical and/or physical properties. The initial mixture to be separated must be liquid at the temperature of the treatment, either by being normally liquid at the temperature and pressure of the treatment, or by being dissolved in a suitable solvent.

A number of methods employing various liquid solvents is known for effecting the separation of high-molecular mixtures, such as hydrocarbon oils, into several portions of different compositions. Thus, certain high molecular asphaltic or resinous substances and/or paraffin wax may be separated from hydrocarbon oil by diluting the oil with light, normally liquid hydrocarbons, or with liquefied, normally gaseous hydrocarbons, such as butane, propane, ethane, and the like. Asphaltic and resinous substances can be separated not only at room temperatures, but also at elevated temperatures; but the separation of wax is generally effected at reduced temperatures. In either type of separation, the solvent is used under conditions at which it is in the liquid state and generally at temperatures far below its critical temperature. When, as in dewaxing operations, the temperature is lowered by reducing the pressure of a solution of oil in a diluent to cause the vaporization of a portion of the diluent, the vaporized diluent escapes from the solution, and the density of the solution of oil in the unvaporized diluent is not lowered.

It is, moreover, known to effect the fractionation of hydrocarbon mixtures by adding methane or ethane to the hydrocarbon mixture or to the solution of the hydrocarbon mixture in suitable solvents, whereby the density of the mixture is lowered, and the mixture is caused to separate into two liquid phases of different specific gravities. The successive fractionation of the mixture is, in this type of process, effected by forcing more gas into the mixture or into a lighter phase which was formed at a previous stage, so that the process is carried out under conditions which are in the field of equilibrium between the gas and liquid phases.

In accordance with the present invention it was found that separations of the hydrocarbon mixture into a series of phases of different specific gravities can be effected without the stepwise addition of the gaseous treating agent, by working at suitable temperatures and pressures.

Briefly, the process according to the present invention comprises the steps of commingling the initial mixture of high-molecular substances, or a solution of the mixture in a suitable solvent, with a low-molecular treating agent, subjecting the resulting mixture to a pressure sufficiently high to dissolve at least a portion of the mixture in the treating agent to form a light, liquid phase, and reducing the pressure in one or more steps, while maintaining the system at a temperature at which the low-molecular treating agent is in the para-critical state, thereby lowering the density of the light liquid phase, and causing certain of the high-molecular substances to become insoluble therein and separate out into a separate heavier non-gaseous phase, which may be liquid, semi-liquid or solid. The heavier phase is separated from the lighter phase before a further lowering of the pressure; if a portion of the initial material is initially undissolved, it may likewise be removed before lowering the pressure.

The initial mixture and the treating agent may be commingled at any desired temperature and pressure, which may be the same as, or different from the conditions at which the first reduction of pressure is effected. The pressure prior to the first expansion is considerably above the equilibrium vapor pressure of the low-molecular treating agent, and the pressure throughout the process is sufficiently high to preclude the formation of a gas phase, the density of which is essentially less than the critical density of the low-molecular treating agent. In the present specification and claims, a phase having a density greater than said critical density of the low-molecular treating agent is designated as "liquid."

My process is based on the following considerations: The "dissolving capacity" of the abovementioned low-molecular substance with regard to high-molecular substances depends upon the density, in the sense that the less the density, i. e., the number of molecules per unit volume, the less the "dissolving capacity." On the other hand, the solubility of the high-molecular substances in the "liquid" treating agents decreases with increasing molecular weight of the high-molecular substances. Thus, if it is possible sufficiently to reduce the density of such a "liquid" treating agent in which a high-molecular mixture is dissolved, the high-molecular mixture will separate into two non-gaseous phases, provided that the temperature is not too high. The heavier of these phases will contain the higher molecular substances which have now become "insoluble" and the other will be a solution of the lower molecular substances of the high-molecular mixture in the treating agent. These liquid phases may be separated by decantation, or centrifuging, or in any suitable manner, without changing their compositions. After this separation, the density of the treating agent in the lighter liquid phase may again be reduced by a further reduction of the pressure, whereby the mixture is again caused to separate into two non-gaseous phases of different specific gravities. By repeating this treatment on successive light liquid phases in a series of steps, and using progressively lower pressures, the high-molecular mixture may be fractionated into any desired number of fractions having different properties.

In order to render it possible sufficiently to vary the density of the low-molecular treating agent by controlling the pressure, the process must be carried out at a temperature in the proximity of the critical temperature of the gaseous treating agent, in view of the fact that at these temperatures the compressibility of the "liquid" (as defined above) is very great, being of the order of that of the gas phase. In the present specification and claims, a substance near its critical temperature or above its critical temperature is designated as being in its "paracritical state." The lowest temperature at which a low-molecular substance may be regarded as being in the para-critical state, i. e., the lower limit of the useful operating temperature range, will depend upon the nature of the low-molecular substance, and upon the solubility of the various components of the initial mixture therein, but generally lies between the critical temperature and the temperature of maximum solubility, i. e., the temperature above which a rise in the temperature of the low-molecular treating agent in the liquid state under its own vapor pressure is accompanied by a decrease in its solvent power for the high-molecular substances. In general, a substance is in its para-critical state when its temperature is not more than about 30° C. to 60° C. below its critical temperature, or is at or above its critical temperature, although these limits are not rigid, and may in certain cases be exceeded. The upper limit of the useful operating temperature is generally determined by the considerations that the high-molecular substances must not undergo decomposition and that at greatly elevated temperatures the high-molecular substances are more highly miscible with one another, and their demixing at excessively high temperatures is impossible. The temperature is, therefore, preferably low enough to cause the high-molecular substances to be in their "normal liquid state," i. e., to be at a temperature below their para-critical temperature.

Moreover, the entire treatment must be carried out at pressures at which no real gas phase will be present, i. e., at which no phase will be found which has a density essentially less than the critical density of the treating agent. When working at temperatures below the critical temperature of the gaseous treating agent, and under pressures which are lower than those mentioned above, as, for example, in the field of equilibrium between gas and liquid, the reduction of the pressure would cause only a separation of the treating agent from the solution of high molecular substances in the "liquid" treating agent to form a gas phase, and the density of the treating agent which remains in the liquid solution with the high molecular substances would not be lowered thereby. If the pressure is lowered sufficiently, all of the treating agent will thus be separated to form the gas phase. On the other hand, when working at temperatures above the critical temperature of the gaseous treating agent, if the pressure were lower than that mentioned above, the treating agent would expand so as to form a phase having so low a density that it will contain substantially no high molecular substances, and the step-wise fractionation of the high molecular substances becomes impossible.

The quantity of the low-molecular treating agent which must be in the liquid phase depends upon the relative solubilities of the components of the high-molecular mixture, and upon the compressibility of the low-molecular agent at the temperature of operation. In most cases, from two to ten parts by weight of the low-molecular treating agent to one part by weight of dissolved high-molecular mixture are suitable, although these limits may in certain cases be exceeded. As a specific example, it may be stated that when it is desired to separate a lubricating oil base material into various lubricating oil fractions with the aid of propane, (critical temperature 98° C.), it is possible to produce a mixture consisting of between 70 to 90% propane and 30 to 10% oil, and operate at temperatures from about 60° C. or higher, preferably about 100–110° C. (but below the critical temperature of the mixture of propane and oil) and at an initial pressure of about 50 to 110 atmospheres. The pressure is then reduced stepwise, to about 45 atmospheres or lower, or until a gaseous phase begins to form, the heavier phase produced upon each drop in pressure being removed from the lighter liquid phase.

As a low-molecular treating agent I may employ any low-molecular substance which may be brought into solution with the high-molecular substance under super-atmospheric pressure in its para-critical state. Moreover, any low-molecular substance which may be more readily brought into solution with the high molecular substance at the stated conditions by the aid of a mutual solvent may be employed. It is necessary to choose low-molecular treating agents with critical temperature low enough so that the temperature of operation is not inconveniently high, will not cause the decomposition of the high-molecular substances, and will not be so high as to prevent the formation of two non-gaseous phases, since a rise in temperature at constant density generally is accompanied with a corresponding increase in the miscibility of the component of the high-molecular mixture. In view of these requirements I prefer, when treating hydrocarbon oils, to employ low-molecular substances having critical temperatures low enough to be employed below 200° C. The preferred group of low-molecular substances, therefore, consists of aliphatic hydrocarbons, saturated as well as unsaturated, having between one and six carbon atoms in the molecule, such as methane, ethane, ethylene, propane, propylene, acetylene, normal- or iso-butane, pentanes, and hexanes, etc., although aliphatic substances having as many as eight carbon atoms may in certain cases be employed. Among other low-molecular substances which may be employed as treating agents, the following may be mentioned, without, however, restricting the scope of the invention thereto: carbon dioxide, carbon oxysulfide, nitrous oxide ($N_2O$), dry natural gas, natural gas, cracked gases, sulfur dioxide, hydrogen sulfide, ammonia, methyl chloride, ethyl chloride, dichlor-difluor methane, methylene fluoride, dimethyl ether, methyl ethyl ether, trimethyl amine, dimethyl amine, cyanogen, hydrogen chloride, watergas, hydrogen and even rare gases, such as argon. The treating agent should, preferably, be incapable of reacting chemically with the high-molecular substances under the conditions of the treatment, no chemical change being contemplated in the treatment. Some of the non-hydrocarbon substances are particularly useful in separating non-hydrocarbon mixtures, such as animal or vegetable waxes, while the hydrocarbons are preferred for the separation of hydrocarbon oils, as they are readily available in the manufacture of the hydrocarbon oils.

The nature of the mutual or added solvent to be employed depends upon the characteristics of the high-molecular mixture to be separated and upon the characteristics of the gaseous treating agent. When treating hydrocarbon oils with methane, ethane, natural gas, and similar hydrocarbons, low boiling hydrocarbons have been found to be suitable. Examples of these are: propane, propylene, butane, pentane, hexane, light straight run naphthas, and other light, preferably aromatic-free fractions of mineral oil.

Alternatively, or in conjunction with the above hydrocarbon solvents, a solvent from the group of solvents known as selective or naphthenic (or aromatic) solvents may be employed. Examples of these are: sulfur dioxide (at temperatures below para-critical, i. e., below about 100° C.), furfural, nitrobenzene, BB' di-chloroethyl ether, cresylic acid, phenol, aniline, quinoline, and a large number of others, their mixtures, or their solutions with diluents. In using such a selective solvent the high-molecular mixture may be dissolved in the solvent before the introduction of the gaseous treating agent or added in the course of the treatment, selective solvents being preferably insufficient to cause the high molecular mixture to separate into two phases at the temperature of the treatment and in the absence of the gaseous treating agent. The purpose of adding the solvent to the high-molecular mixture is to increase the solubility in the gaseous treating agent and/or to change the character of the fractions produced.

The added solvent should preferably have a higher critical temperature than the low-molecular treating agent, so as to be in the normal liquid state under the conditions of the treatment, although it may be added to the mixture either in the vaporous or liquid state. Thus, when propane is used as the low-molecular treating agent, butane or a higher boiling solvent should be employed as the solvent; and when $SO_2$ is used as a solvent, methane, ethane, ethylene, or carbon dioxide is preferably used as the treating agent.

Figure 2:
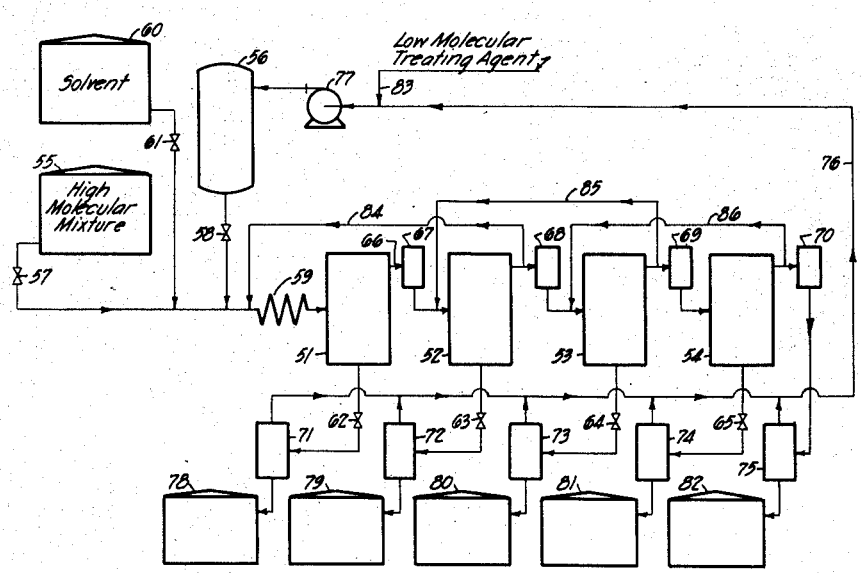
Figure 3:
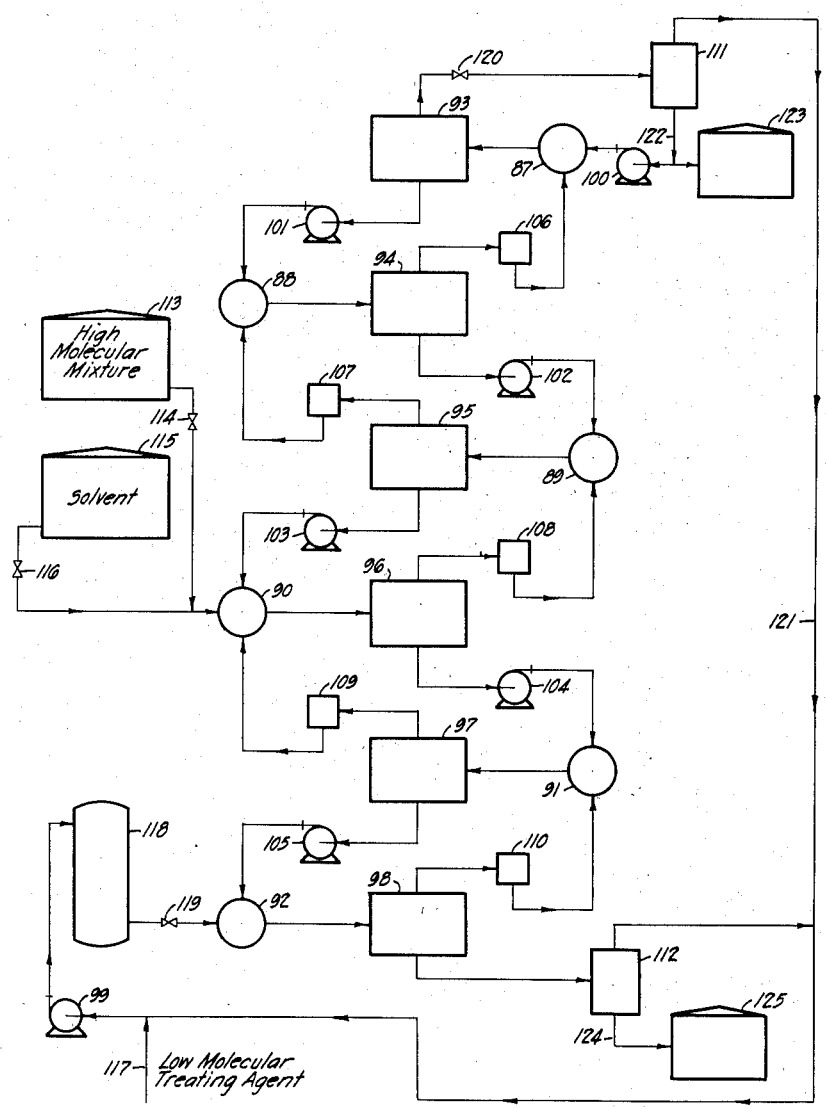

The process may, for example, be carried out in the apparatus shown in the accompanying drawings, in which Figures 1, 2 and 3 are schematic flow diagrams of several forms of apparatus suitable for practicing my invention.

For convenience, the apparatus will be described with reference to the treatment of a hydrocarbon oil, it being understood that the same forms of apparatus may also be employed for treating non-hydrocarbon mixtures of high molecular substances.

Referring particularly to Figure 1, 1 is a treating vessel adapted to contain the mixture undergoing treatment under the requisite temperature and pressure, being provided with a stirring apparatus 2 and means to regulate the temperature, such as a jacket 3, as shown, or coils, constructed to contain heating or cooling fluid. The hydrocarbon oil is fed into the vessel 1 from a tank 4 through a valve 5. If desired, a solvent, such as a selective solvent, or a low boiling hydrocarbon solvent, may be introduced from a tank 6 through a valve 7, and mixed with the oil either before or after being introduced into the vessel 1. The low-molecular treating agent, such as propane, may be introduced through a conduit 8, compressor 9, pressure tank 10 and valve 11 which may comprise a check valve. The treating agent may be introduced either in the gaseous or in the liquid state, depending upon the temperature and pressure; but after the temperature and pressure are adjusted the conditions in the vessel 1 are such that there is no phase having a density lower than the critical density of the gaseous treating agent. When the desired pressure and temperature have been established in the vessel 1, the valve 11 is closed, and the substances are mixed with the aid of the stirring apparatus 2. After mixing, the solution is allowed to remain quiescent at constant pressure to permit the undissolved substances, if any, to settle to the lower conical portion of the vessel. If no substances remain undissolved, the pressure in the vessel is reduced, as by withdrawing a portion of the mixture through a conduit 12, and valve 13, to a tank 14, from which the withdrawn mixture can be re-introduced into the vessel 1 in a subsequent treatment through the conduit 15 and valve 16. In consequence of the reduction of the pressure, the liquid in the vessel 1 expands and separates into two non-gaseous phases, the lower fraction settling to the bottom. The settled fraction, whether produced by settling the original mixture, or by reducing the pressure as described, is withdrawn through valves 17 and 18 into a pressure-reducing and gas-separating apparatus 19, in which the pressure of the withdrawn phase is reduced and the entrained gaseous treating agent is separated from the oil component, if desired through the application of heat, or by any other method, the treating agent being returned to the tank 10 through a conduit 20, and the high-molecular oil components being fed through a conduit 21 to a tank 22. The first heavy fraction will generally be highly viscous and asphaltic in character, and will contain asphaltenes and similar hard substances unless the feed mixture in the tank 4 is asphalt-free.

If it is desired to maintain the pressure in the vessel 1 substantially constant while withdrawing the heavy phase, additional oil from the tank 4, and/or solvent from the tank 6, and/or treating agent from the tank 10 may be introduced simultaneously to compensate for the volume of the withdrawn phase.

If the oil contains, as most distillation residues do, certain asphaltic substances, it is often preferable to deasphaltize it before treating with the low molecular treating agent under high pressures. Thus, these materials may be precipitated by dissolving the oil in a deasphalting agent, such as propane, butane, pentane, hexane, light naphtha, etc., and the precipitated materials separated from the solution of oil in the deasphalting agent, the latter being introduced into the vessel 1. If desired this deasphalting may be carried out in the vessel 1 before the introduction of the treating agent from the tank 10, as by employing one of the above deasphalting agents as the mutual solvent for the high-molecular mixture and the treating agent. The deasphalting agent, or a portion thereof, may then be retained in the oil solution, replacing or supplementing the solvent from the tank 6. Moreover, in certain cases, as where a low-molecular deasphalting agent with a low critical temperature, such as propane, has been employed, the deasphalting agent can be used as the low-molecular treating agent, by suitably bringing the temperature of the solution to the required point after the separation of the asphalt by means of the temperature control means 3, and establishing the necessary initial pressure by any suitable method.

After the removal of the first heavy phase from the vessel 1, the valve 17 is closed and the pressure is reduced by opening the valve 13, in consequence of which the liquid phase in the vessel 1 expands and again separates into two non-gaseous phases. The valve 13 being again closed and the valve 17 opened, a second fraction, e. g., a heavy cylinder oil, is led out of the vessel 1 through a valve 23, freed from the entrained treating agent in the apparatus 24, and led to storage tank 25, as described above for the first heavy fraction. The pressure is subsequently reduced again in the manner already described, and successive heavy fractions are drawn off through the valves 26 and 27, freed from the treating agent in the apparatus 28 and 29, and led to storage tanks 30 and 31, it being understood that any number of fractions may be produced by regulating the size of the pressure decrements. Most of the treating agent will remain in the lighter phases, the last one of which is similarly withdrawn as the last fraction. If a solvent from the tank 6 has been employed, the gas separating devices 19, 24, 28 and 29 may be operated to separate the solvent as a separate product, or, if desired, separate distillation units may be provided.

Instead of opening and closing the valves 13 and 17 at each stage of the process, the heavier phase can be drawn off continuously, the product leaving the vessel being after proper time intervals led to the different storage tanks by the manipulation of the valves 18, 23, 26 and 27, in a manner similar to distillation.

The lowering of the pressure in the vessel 1 may often be effected without recourse to the valve 13, the expansion due to the withdrawal of the heavy fractions being sufficient to cause the further formation of two liquid phases. When the withdrawal of this phase causes the lighter phase to expand more than is desired, the volume may be decreased by the use of pistons, or by introducing an inert liquid which is immiscible with the substances being treated, e. g., water, mercury, and the like, the volume of which can be controlled hydraulically in the container, in a manner known to those skilled in the art. Similarly, by withdrawing these inert bodies from the vessel, its pressure can be effectively reduced.

Figure 2 illustrates a form of apparatus particularly adapted for the continuous operation of my process. 51, 52, 53 and 54 are treating vessels, similar to the vessel 1 of Figure 1, and may be provided with suitable temperature control devices, not shown. The hydrocarbon oil from the tank 55 (previously deasphalted, if desired) and the treating agent from the tank 56 may be continuously fed at the highest requisite pressure through valves 57 and 58, mixed in the mixer 59, and introduced into the vessel 51. A solvent may, if desired, be introduced from the tank 60 through a valve 61. The heavy fraction which separates in the tank 51 may be drawn continuously off at the bottom through a valve 62, and the lighter phase may be withdrawn through an outlet 66, flowed through a pressure-reducing valve or expansion engine 67 (which may be used to conserve the energy released) and introduced into the vessel 52 at a lower pressure, where it again separates into two liquid phases. Thence the lighter phase passes successively through the valves or expansion engines 68, 69 and 70, a heavy phase being withdrawn from each of the vessels 52, 53 and 54 through the valves 63, 64 and 65. The resulting fractions are separately brought to atmospheric pressure in the apparatus 71 to 75, the gaseous treating agent being returned to the tank 56 by means of the conduit 76 and the compressor 77, and the oil portions being led to the tanks 78 to 82. The apparatus 71 to 75 may be similar to the apparatus 19 of Figure 1, and may be operated to produce the solvent as a separate product. Fresh treating agents may be introduced into the system at 83.

When sharp fractionation is desired, a rectification treatment may be employed, whereby a portion of the lighter phase is returned to a stage preceding that at which it was produced as through conduits 84, 85 and 86.

The process may also be carried out in a countercurrent manner, as illustrated in Figure 3. In this figure, 87 to 92 are mixing devices; 93 to 98 phase separators, such as settling tanks, centrifuges, etc.; 99 to 105 are pumps; 106 to 110 are pressure-reducing valves or expansion motors, which may be similar to motors 67 to 69 in Figure 2; and 111 and 112 are pressure-reducing and distilling apparatus, for separating high-molecular substances from the treating agent and from the solvent, if the latter is employed, and may be similar to the apparatus 19 of Figure 1.

The hydrocarbon oil, preferably asphalt-free, is fed from the tank 113 through a valve 114 into the mixer 90; if desired, it may be mixed with a solvent from the tank 115 and valve 116. The low-molecular treating agent is introduced into the system through the inlet 117, brought to the required pressure by the pump 99, and fed from the tank 118 through a valve 119 into the mixer 92, so as to flow through the successive mixers and separators countercurrently to the oil. The pressure increases progressively from the mixer 87 and separator 93 towards the mixer 92 and separator 98, the heavier phase from each separator being brought to the required pressure by means of the pumps 100 to 105, and the pressure in each lighter phase from the separators being lowered by flowing the phase through the valves or motors 106 to 110.

The pressure in each of the separators is adjusted so that the mixture introduced will separate into two non-gaseous phases, the heavier phase containing the components of the high-molecular mixture which are relatively less soluble in the "liquid" treating agent, and a relatively small amount of the treating agent; and the lighter liquid phase contains the relatively more soluble components and most of the treating agent. The light liquid phase from the separator 93 is withdrawn through a valve 120 and freed from all or a portion of the treating agent in the apparatus 111, the treating agent being returned to the tank 118 through a conduit 121, and the refined high-molecular substance being withdrawn through a conduit 122 to a storage tank 123. A portion of the high-molecular product from the conduit is introduced into the mixer 87 as a reflux.

The heavy phase from the separator 98 is similarly treated in the apparatus 112, the high-molecular material being withdrawn through a conduit 124 to a storage tank 125.

The temperature in any of the above modes of operation may vary within the limits mentioned above, or may be maintained substantially constant. If, for example, it is desired to raise the solubility of the high-molecular substances at a given pressure—which is often necessary, because one is by the construction of the apparatus, limited to a certain maximum pressure—the temperature must be lowered, whereby the density of the treating agent is increased. If, on the other hand, it is desired to increase the solubility at a constant volume, the temperature must be raised. The reason for this will be apparent by considering that at a constant pressure the lowering of the temperature will cause an increase of the density of the liquid phase to such an extent that its effect on the solubility exceeds the direct solubility-decreasing effect of lowering the temperature.

The process according to this invention can be carried out to best advantages adiabatically, whereby the temperature is automatically controlled at each stage in connection with the pressure variation, without any heat being supplied or drawn off. The treating vessel or vessels may in this case be provided with suitable heat insulation.

As compared with distillation, the process according to this invention has the great advantage that high boiling hydrocarbon mixtures or other mixtures of high molecular substances can be split up into fractions without danger of cracking. It is even possible to obtain very high molecular fractions, which cannot be obtained by the usual distillation because of the simultaneous cracking of these components.

My process can, if desired, be combined with other processes usually employed to effect the separation of mixtures, such as chemical refining, distillation, extraction, etc. The oil may be dewaxed either before or after being treated in accordance with my process.

As further examples of mixtures of high molecular weight which may be separated according to my process, may be mentioned lubricating oil obtained by polymerization of olefines, mixtures of polymerized fatty oils, e. g., voltolized rapeseed oil, mixtures of esters of fatty acids, and mixtures of substances obtained after the separation of asphaltenes from asphalt.

While the separation effected by my process is mainly on the basis of molecular weight, and is for this reason analogous to distillation, I have found that the compositions of the several fractions produced are not exactly the same as fractions produced by distillation. For example, in the fractionation of hydrocarbon oils, the heavier fractions produced by my process, and especially the first heavy fractions, are somewhat more aromatic than the oil remaining dissolved in the corresponding lighter phase, so that it becomes possible to apply my process to the manufacture of paraffinic oils by the separation of heavy aromatic portions in the first heavy phase or phases.

Moreover, the different hydrocarbons which are present in the heavy phases have different boiling temperature ranges, the highest boiling hydrocarbons in any one fraction having the highest viscosity index, and being the most paraffinic, while the lower boiling hydrocarbons occurring in the same fraction are more aromatic in nature. For this reason it is generally preferable to dewax the oil before subjecting it to the treatment according to my invention, thereby preventing the presence of the high boiling waxes in the first heavy phase or phases, which are highly asphaltic. Wax-containing stocks may, however, be treated, the heavy phase being treated with suitable dewaxing solvents to separate the paraffin wax from the asphaltic and aromatic materials.

As used in the present specification and claims, the term "mixture" is used to designate any state of aggregation, whether homogeneous or heterogeneous, while the term "solution" is used to designate a substantially homogeneous phase.

*Examples*

1. 25 parts by weight of a voltolized vegetable oil, having a viscosity of 150° Engler at 50° C., are dissolved at room temperature into 75 parts by weight of commercial butane. The temperature was then raised, without removing butane, till the pressure amounted to 100 kg./cm.$^2$. Thereafter the temperature was raised to approximately 95° C., while maintaining the pressure at 100 kg./cm.$^2$. At this temperature the pressure was released to 17 kg./cm.$^2$, causing the separation of a heavy fraction (about 30 per cent. by weight of the original oil), which after removal of the butane had a viscosity of more than 300° Engler at 50° C. and appeared to be very suitable for increasing the viscosity index of lubricating oil.

2. A homogeneous mixture of 10 parts by weight of stand oil and 90 parts by weight of dimethyl ether was heated in an autoclave till the pressure amounted to 80 kg./cm.$^2$. Then the temperature was raised to 103° C., while keeping the pressure constant. At this temperature the pressure was reduced to 35 kg./cm.$^2$, causing the separation of a fraction (approximately 30% by weight of the original stand oil), which after removal of the dimethyl ether appeared to have quicker drying properties than the original stand oil. The density at 25° C. $d$ 25/4 of the original stand oil was 0.963 and of the separated fraction 0.984.

3. A mixture consisting of 90 parts by weight of dimethyl ether and 10 parts by weight of stand oil was heated to a temperature of 145° C. During the heating-up period the pressure was first raised to 126 kg./cm.$^2$ and further kept constant till the temperature amounted to 145° C. At this temperature the pressure was released to 110 kg./cm.², which caused the separation of a heavy fraction, having quicker drying properties than the original stand oil. After removal of the dimethyl ether the fractions obtained had the following constants:

|  | Separated fraction | Fraction remaining in solution | Original stand oil |
| --- | --- | --- | --- |
| d 25/4 | 0.982 | 0.953 | 0.963 |
| n 50 | 1.489 | 1.477 | 1.481 |
| Yield percent | 34 | 66 |  |

4. A lubricating oil residue was freed from asphalt and resins. 24 parts by weight of the resulting product were dissolved at room temperature into 76 parts by weight of commercial propane and the solution was then heated till the pressure was about 180 kg./cm.². While keeping this pressure constant the solution was further heated to a temperature of 147° C. At this temperature the pressure was reduced to 110 kg./cm.², which caused the separation of a fraction. A second fraction separated out upon the pressure being further reduced to 96 kg./cm.², and by still further reducing the pressure a third fraction separated out. The properties of the various fractions were as indicated in the table here below.

| Temperature | Final pressure at the removal of the fraction | Yield in percent by weight | d 25/4 |
| --- | --- | --- | --- |
|  | Kg./cm.² |  |  |
| 147 | 110 | 18 | 0.926 |
| 147 | 96 | 18 | 0.909 |
| 147 | 85.5 | 36 | 0.900 |
| 147 | <85.5 | 28 | 0.876 |
| Original oil |  |  | 0.897 |

I claim as my invention:

1. A process for separating a high-molecular mixture the constituents of which are totally miscible at the temperature of the process into portions having different properties, comprising the steps of subjecting said mixture, together with a quantity of a low-molecular treating agent, to temperature and pressure conditions at which said treating agent is in its para-critical state said temperature being above the critical temperature of said low molecular treating agent and at least a portion of the mixture is dissolved in the treating agent, thereby forming a liquid phase containing a treating agent and dissolved high-molecular substances, reducing the pressure under conditions causing a decrease in the density of the treating agent in said liquid phase, thereby causing the precipitation of a portion of the dissolved high-molecular substances from the liquid phase to form a separate heavier phase, and separating the resulting phases, the reduced pressure being sufficient to prevent all of the dissolved high-molecular substances from being precipitated and the temperature being below the paracritical temperature range for said high molecular mixture.

2. The process according to claim 1, in which the expansion of the dissolved mixture is carried out isothermally.

3. The process according to claim 1, in which the expansion of the dissolved mixture is carried out adiabatically 4. The process according to claim 1 in which the high-molecular mixture is a hydrocarbon oil and the low-molecular treating agent is a non-hydrocarbon having a critical temperature below 250° C.

5. The process according to claim 1 in which the high-molecular mixture is an asphalt-free hydrocarbon oil.

6. A process for separating a high-molecular mixture the constituents of which are totally miscible at the temperature of the process into portions having different properties, comprising the steps of mixing said mixture with a quantity of a low-molecular treating agent, subjecting the resulting mixture to a temperature and pressure at which said low-molecular treating agent is in its para-critical state said temperature being above the critical temperature of said low molecular treating agent and a portion of the mixture is dissolved in the treating agent, thereby forming a light liquid phase containing a treating agent and dissolved high-molecular substances, and a heavier phase containing undissolved high-molecular substances, removing said heavier phase from the light liquid phase, reducing the pressure on the light liquid phase under conditions causing a decrease in the density of the treating agent in the light liquid phase, thereby causing the precipitation of a portion of the dissolved high-molecular substances to form a heavier phase, and separating the resulting phases, the reduced pressure being sufficient to prevent all of the high-molecular substances from being precipitated and the temperature being below the paracritical temperature range for said high molecular mixture.

7. A process for separating a high-molecular mixture the constituents of which are totally miscible at the temperature of the process into portions having different properties, comprising the steps of mixing the said mixture with a quantity of a low-molecular treating agent which at elevated pressures and in its paracritical state is miscible with at least a portion of the mixture and is incapable of reacting chemically therewith, and having a low enough critical temperature to cause certain components of the dissolved high-molecular mixture to become insoluble therein upon a decrease in the density of the treating agent in the para-critical state while certain other components remain dissolved therein, subjecting the resulting mixture of treating agent and high-molecular mixture to temperature and pressure conditions at which said treating agent is in its paracritical state said last-mentioned temperature being above the critical temperature of said low molecular treating agent and at least a portion of the high-molecular mixture is dissolved therein, thereby forming a liquid phase, reducing the pressure on said phase under conditions causing a decrease in the density of the treating agent in said liquid phase, thereby causing the precipitation of a portion of the dissolved high-molecular substances from the liquid phase to form a separate heavier phase, and separating the resulting phases, the reduced pressure being sufficient to prevent the formation of a phase having a density lower than the critical density of the treating agent and the pricipitation of all of the dissolved high-molecular substances and the temperature being below the paracritical temperature range for said high molecular mixture.

8. The process according to claim 7 in which the high-molecular mixture is dissolved in a mutual solvent for the high-molecular mixture and the treating agent, said mutual solvent having a critical temperature high enough to be present in its normal liquid state at the temperature of the treatment.

9. A process for separating a high-molecular mixture the constituents of which are totally miscible at the temperature of the process into a plurality of portions having different properties, comprising the steps of subjecting said mixture together with a quantity of a low-molecular treating agent, to temperature and pressure conditions at which said treating agent is in its para-critical state said temperature being above the critical temperature of said low molecular treating agent and at least a portion of the mixture is dissolved in the treating agent, thereby forming a primary liquid phase containing treating agent and dissolved high-molecular substances, reducing the pressure on the primary liquid phase under conditions causing a decrease in the density of the treating agent in said liquid phase, thereby causing the precipitation of a portion of the dissolved high-molecular substances and the formation of a secondary light liquid phase and a secondary heavier phase, separating said phases, reducing the pressure on the separated secondary light liquid phase under conditions causing a further decrease in the density of the treating agent in the secondary light liquid phase, thereby causing the precipitation of a portion of the high-molecular substances dissolved therein to form a tertiary light liquid phase and tertiary heavier phase, and separating the tertiary heavier phase from the tertiary light liquid phase, the reduced pressure at which the tertiary phases are formed being sufficient to prevent the precipitation of all of the dissolved high-molecular substances and the temperature being below the paracritical temperature range for said high molecular mixture.

10. In a continuous process for separating a high-molecular mixture the constituents of which are totally miscible at the temperature of the process into a plurality of portions having different properties, the steps of continuously subjecting successive portions of said high-molecular mixture and a low-molecular treating agent, to temperature and pressure conditions at which said treating agent is in its para-critical state, said temperature being above the critical temperature of said low molecular treating agent, said high molecular mixture is below its paracritical temperature range and at least a portion thereof is dissolved in the treating agent, thereby forming a primary liquid phase containing treating agent and dissolved high-molecular substances, continuously introducing said primary liquid phase into a first chamber at a reduced pressure under conditions causing a decrease in the density of the treating agent in said liquid phase, thereby causing the precipitation of a portion of the dissolved high-molecular substances and the formation of a secondary light liquid phase and a secondary heavier phase, continuously withdrawing at least the secondary light liquid phase and introducing it into a second chamber at a pressure lower than the pressure in the first chamber under conditions causing a decrease in the density of the secondary light liquid phase, thereby causing the precipitation of a portion of the dissolved high-molecular substances and the formation of a tertiary light liquid phase and a tertiary heavier phase, and continuously withdrawing at least the tertiary light liquid phase from the second chamber, the pressure in the second chamber being sufficient to prevent the precipitation of all of the dissolved high-molecular substances.

11. The process according to claim 10, in which a portion of the high-molecular substances dissolved in a light liquid phase is returned to a chamber preceding the chamber in which the said light liquid phase was produced.

12. In a continuous process for separating a high-molecular mixture the constituents of which are totally miscible at the temperature of the process into several portions having different properties, the steps of subjecting said mixture together with a quantity of a low-molecular treating agent to temperature and pressure conditions at which said agent is in its paracritical state said temperature being above the critical temperature of said low molecular treating agent, said high molecular mixture is below its paracritical temperature range and at least a portion thereof is dissolved in the treating agent, thereby forming a light liquid phase containing a treating agent and dissolved high-molecular substances continuously reducing the pressure on said light liquid phase under conditions causing a gradual decrease in the density of the treating agent in said light liquid phase, thereby continuously precipitating successive portions of the dissolved high-molecular substances to form an additional heavier phase, and continuously removing the precipitated heavy phase from the said light liquid phase.

13. The process according to claim 12, characterized in that the heavier phase is run off to different receiving vessels in the course of the treatment, whereby a plurality of products of different properties are obtained.

14. In a continuous process for separating a high-molecular mixture the constituents of which are totally miscible at the temperature of the process into several portions having different properties with the aid of a low-molecular treating agent having a low enough critical temperature to possess selective solvent properties with respect to the components of the high-molecular mixture when the low-molecular treating agent is in its para-critical state, the steps of maintaining a plurality of contact zones at progressively decreasing pressures, the pressure and temperature in each of said zones being such as to cause a portion of the high-molecular mixture to be soluble in the treating agent and another portion to be insoluble therein, the high molecular mixture to be below its paracritical temperature range and the treating agent to be in its paracritical state said last-mentioned temperature being above the critical temperature of said low molecular treating agent, continuously introducing the low-molecular treating agent into a zone of high pressure, continuously introducing the high-molecular mixture into a zone of lower pressure, causing the high-molecular mixture to flow countercurrently to the treating agent through contact zones under conditions causing a step-wise decrease in the density of the low-molecular treating agent, thereby forming in each contact zone a light liquid phase containing a major portion of the treating agent and dissolved high-molecular substances, and a heavier phase containing undissolved high-molecular substances, withdrawing a light liquid phase from the process at a zone of relatively lower pressure, and withdrawing a heavy phase from the process at a zone of relatively higher pressure.

15. The process according to claim 14, in which the withdrawn light liquid phase is treated to separate at least a portion of the treating agent from the dissolved high-molecular substances, and a portion of the said dissolved high-molecular substances is returned to the process.

16. The process according to claim 14, in which the initial high-molecular mixture is introduced into an intermediate contact zone, the light liquid phase withdrawn from the process is withdrawn from a zone having a lower pressure than the zone into which the initial mixture is introduced, the withdrawn light liquid phase is treated to separate at least a portion of the treating agent from the dissolved high-molecular substances, and a portion of the said dissolved high-molecular substances is returned to a contact zone near the point of withdrawal of said light liquid phase.

17. The process according to claim 14, in which the expansion of the low-molecular treating agent is adiabatic.

18. A process for separating a high-molecular non-hydrocarbon mixture the constituents of which are totally miscible at the temperature of the process into portions having different properties, comprising the steps of subjecting said mixture, together with a quantity of a low-molecular treating agent, to temperature and pressure conditions at which said treating agent is in its para-critical state said temperature being above the critical temperature of said low molecular treating agent, said high molecular mixture is below its paracritical temperature range and at least a portion thereof is dissolved in the treating agent, thereby forming a liquid phase containing a treating agent and dissolved high-molecular substances, reducing the pressure under conditions causing a decrease in the density of the treating agent in said liquid phase, thereby causing the precipitation of a portion of the dissolved high-molecular substances from the liquid phase to form a separate heavier phase, and separating the resulting phases, the reduced pressure being sufficient to prevent all of the dissolved high-molecular substances from being precipitated.

19. The process according to claim 18, in which the low-molecular treating agent is a non-hydrocarbon having a critical temperature below 250° C.

20. The process according to claim 18 in which the low-molecular treating agent is a hydrocarbon containing less than seven carbon atoms in the molecule.

21. A process for separating a hydrocarbon material containing normally gaseous and higher molecular weight hydrocarbons into portions having different properties comprising the steps of reducing the pressure on said mixture at a temperature above the critical temperature of said normally gaseous hydrocarbon from a high superatmospheric pressure at which said material exists as a fluid phase having a density greater than the critical density of the normally gaseous hydrocarbon to a lower superatmospheric pressure under conditions causing a decrease in the density of the normally gaseous hydrocarbon, thereby precipitating a portion of said hydrocarbon material to form a heavier, liquid phase, and separating the resulting heavier, liquid phase from the unprecipitated portion of said hydrocarbon material.

WILLEM J. D. VAN DIJCK.